Patented May 15, 1951

2,553,369

UNITED STATES PATENT OFFICE 2,553,369

FROZEN FOOD THAWING INDICATOR

Sigmund Hoffman, Buffalo, N. Y., assignor of one-third to Irving N. Rosen and one-third to Emil L. Cohen No Drawing. Application November 16, 1948, Serial No. 60,401

3 Claims. (Cl. 73—358)

This invention relates to frozen food indicators or telltales and particularly to a means for accurately determining whether frozen food packages or frozen food articles have been continuously kept in a properly refrigerated condition.

From the time that frozen food packages leave the original processor until they reach the ultimate consumer there are many occasions when they may become exposed to above freezing temperatures, either due to inadvertence or actual carelessness for periods of time sufficient to impair their subsequent quality. The ability to determine whether this has occurred is invaluable, not only to the ultimate consumer, but to everyone along the line of distribution from the processor to the consumer, since each link in the chain of distribution is charged with the responsibility of knowing that what he passes down to the next stage of distribution is in proper condition.

At the present time there is no certain and practical means for meeting and properly discharging this responsibility, which falls on the one who receives the goods from the processor and the various wholesalers and jobbers, as well as the ultimate retail dealer who passes the goods on directly to the consumer. In each of these various interchanges down the line there is usually involved a shipment by rail, boat, truck or other means. It is in these trans-shipments that there is the most danger of improper handling and an improper maintenance of refrigeration. Goods may be delivered to a shipper by the processor in properly refrigerated condition and may appear to reach their destination in the same condition of refrigeration as in the beginning and yet they may have been exposed for undue periods to above freezing temperatures on route.

It is well recognized that frozen foods are much more perishable after they have been thawed than other food products. In preparing frozen foods, they are generally blanched in a brief cooking process, and this blanching softens the texture of the food which enables bacteria to multiply rapidly in above freezing temperatures. The food thus deteriorates rapidly in general quality, such as in loss of flavor, undesirable odor and poor texture, and also may deteriorate harmfully by bacteria action until the consumer's health is endangered by using the food.

The full assurance that frozen foods have been maintained properly refrigerated in their entire movement from the processor to the consumer is of particular importance to the processor since the good-will of his name is the thing most intimately associated with the goods all along the line and especially in the mind of the ultimate retail purchaser. Often a brand of frozen foods will suffer and sales will decline for reasons beyond the control of the producer or processor of the goods, through the failure of some intermediary to maintain the goods properly refrigerated.

Ranking in importance with the interest of the producer is that of the ultimate consumer, since the housewife who usually purchases such commodities has no ready means of ascertainment of the fitness of the food unless its deterioration has reached an extreme state or unless the lack of refrigeration is a present condition at the time of purchase.

In the prior art various indicators or devices have been proposed to meet this significant need, but none of them has met with practical success. Some of the prior art devices were not practical because of the size of the device necessary or the expense which it added to the cost of the food product. Further, most of the prior proposals have not met with the test of accuracy and reliability required in a device of this kind. Further, even if consistent in accuracy some of the prior art devices have been unsatisfactory because of the fact that the time periods and temperature ranges in which they operate or can be made to operate are not satisfactory as compared with the permissible or non-permissible conditions to which frozen foods may be subjected, both as to time and temperature conditions. In fact, the time and temperature limits of exposure are variables which are dependent upon each other.

The present invention provides a simple device of substantially no bulk which is inexpensive to prepare and highly reliable, and which operates in time and temperature ranges which are significant and decisive in determining the fitness of frozen food products. Further, the indicator is such that no mistake can be made by one using it to determine the previous conditions to which frozen food products have been exposed, however unskilled or non-technical the observer may be. The device of the present invention indicates improper previous handling by a simple and readily discernible change in color of the indicating medium.

In preparing the frozen food indicator of the present invention in one practical embodiment which is set forth in detail herein by way of example only, a fibrous, porous carrier, such as a strip of commercial filter paper, is first dipped into a solution of soluble starch which may be prepared by adding 2.5 grams of soluble starch, such as Lintner's soluble starch, to 100 milliliters of distilled water, the water being boiled for about one minute and subsequently cooled before introducing the filter paper.

The filter paper is then drawn through a two per cent solution of potassium tri-iodide. This solution may be prepared by dissolving two grams of potassium iodide in one hundred milliliters of distilled water and adding iodine ($I_2$) until saturation of the solution with KI₃ is indicated by the precipitation of excess iodine. The water solution of iodine thus produced is a convenient way of incorporating the active iodine constituent, but it is to be understood that other means of including elemental iodine in the indicator may be employed.

One milliliter of this saturated two per cent solution of KI₃ is diluted with thirty milliliters of distilled water. The filter paper which has previously been immmersed in the starch solution is then drawn through the potassium tri-iodide solution until the paper assumes a uniform blue color. It is the reaction between the starch and the iodine that produces the blue coloration of the indicator.

The strips of paper thus treated are then frozen at 0° Fahrenheit and after freezing and while still in a frozen condition the strips are coated with a starch digesting enzyme such as diastase. The diastase may be prepared by dissolving ten grams thereof, such for instance as commercially available Takadiastase, in 100 milliliters of distilled water. The diastase solution is preferably stored at a temperature of 34° Fahrenheit and is applied to the deep frozen filter strip by dipping the strip into the enzyme solution, the latter being at a temperature just above the freezing point of water.

It has been found that dipping the strip in the diastase solution twice produces an adequately thick coating of frozen enzyme solution over the strip of filter paper. These strips may be prepared in any convenient size and cut into relatively small squares or rectangles, and, without disturbing their deep frozen condition, are placed in hermetically sealed transparent envelopes. By way of example a small cellophane bag or envelope may be heat sealed after a strip of the filter paper has been placed therein. The strip is placed in this hermetic but transparent container for the reason that the moisture included in the indicator as thus prepared is an essential constituent and enters into the action of the enzyme on the starch. Material changes in humidity or moisture content would alter the indicating properties of the device apart from any temperature change, which would, of course, be undesirable.

As stated previously, the blue color is the result of reaction between the starch and the iodine compound. The diastase, the starch digesting enzyme, digests or hydrolyzes the starch at ordinary temperatures, and when it does so the blue color characteristic of the starch-iodine combination disappears. However, in the frozen state the enzyme will not act upon the starch or at least not to such an extent as to digest or hydrolyze it sufficiently to affect the characteristic blue color of the indicator.

The indicator prepared in the specific manner outlined above will lose its blue color in from two to four hours at room temperature (20° centigrade) and from eight to twelve hours at usual refrigerator temperatures (5° centigrade). These time and temperature relationships are generally satisfactory but other ranges of operation for use with various kinds of products or to fit other variant conditions can be attained within the realm of the present invention.

For instance, if the enzyme concentration is decreased the time it will take for the indicator to lose color at a given temperature above the freezing point will be increased. Conversely, an increase in concentration of the enzyme solution will shorten the time it takes the indicator to register a given temperature change. Also, the time may be shortened by using more dilute iodine solutions or increased by using more concentrated iodine solutions.

The indicator of the present invention is highly advantageous in that it lends itself readily to mass production and the reagents used are not harmful to food with which they might come in contact and would meet legal requirements in this regard. Further, the indicator with its enclosing envelope is small and does not in any wise increase the bulk of the package with which it is associated and it is unbreakable.

The indicator is readily inserted in a frozen food package and one desirable mode of inclusion would be to have a window of cellophane or the like in some part of the package beneath which the indicator would be retained. Thus the condition of the indicator could be observed without opening the package.

While a specific form of the indicator and a specific procedure for preparing such an indicator is outlined in the foregoing specification in detail, it is to be understood that the specific ingredients referred to and concentrations specified are subject to variation and change and the scope of the present invention is not limited excepting as defined in the appended claims. The filter paper referred to above is a convenient carrier for the active reagents but is not an essential element, carriers of other forms being available for this general purpose.

What is claimed is:

1. A frozen food thawing indicator comprising a hermetically sealed transparent enclosure containing a carrier bearing, in combination, hydrated potassium tri-iodide and soluble starch and a diastase applied to the carrier at sub-freezing temperatures and maintained thereat prior to use.

2. A frozen food thawing indicator comprising a carrier bearing, in combination, potassium tri-iodide and starch, both in water solution, and a diastase applied to the carrier at sub-freezing temperatures and maintained thereat prior to use.

3. The method of preparing a frozen food indicator which comprises immersing a porous carrier in a water solution containing approximately 2.5 per cent of starch, then immersing the carrier in a 1:30 dilution of saturated 2 per cent potassium tri-iodide in water, reducing the temperature of the carrier to below 32° Fahrenheit, and adding thereto while at such temperature a coating of a 10 per cent solution of diastase in water to produce a frozen coating of the diastase solution on the carrier.

SIGMUND HOFFMAN.

REFERENCES CITED

The following references are of record in the file of this patent:

UNITED STATES PATENTS

| Number | Name | Date |
|---|---|---|
| 2,485,566 | Clark | Oct. 25, 1949 |